United States Patent
Danner et al.

(10) Patent No.: US 6,383,541 B1
(45) Date of Patent: May 7, 2002

(54) ACIDIFIED METAL CHLORITE SOLUTION FOR DISINFECTION OF SEAFOOD

(75) Inventors: Bobby C. Danner; Paul Reeves; Neeraj Khanna, all of Norman, OK (US)

(73) Assignee: Bio-Cide International, Inc., Norman, OK (US)

( * ) Notice: Subject to any disclaimer, the term of this patent is extended or adjusted under 35 U.S.C. 154(b) by 0 days.

(21) Appl. No.: 09/430,064

(22) Filed: Oct. 29, 1999

Related U.S. Application Data

(60) Provisional application No. 60/106,485, filed on Oct. 30, 1998.

(51) Int. Cl.[7] .............................. A23B 4/00; A23B 4/12; A23B 4/14
(52) U.S. Cl. ...................... 426/332; 426/532; 426/262; 422/28; 422/37
(58) Field of Search ................................ 426/321, 332, 426/326, 335, 310, 262, 532; 422/13, 12, 15, 28, 37

(56) References Cited

U.S. PATENT DOCUMENTS

| | | | | |
|---|---|---|---|---|
| 4,084,747 A | * | 4/1978 | Alliger | 239/4 |
| 4,244,978 A | * | 1/1981 | Barta | 426/332 |
| 4,362,753 A | * | 12/1982 | Barta | 426/332 |
| 4,925,645 A | * | 5/1990 | Mason | 423/477 |
| 5,122,282 A | * | 6/1992 | Mason | 210/754 |
| 5,185,161 A | * | 2/1993 | Davidson et al. | 424/665 |
| 5,389,390 A | * | 2/1995 | Kross | 426/332 |

OTHER PUBLICATIONS

Federal Register, vol. 63, No. 16, Bio–Cide Int., Inc. Notice, pp. 3749–3750, Jan. 1998.*

* cited by examiner

*Primary Examiner*—Nina Bhat
(74) *Attorney, Agent, or Firm*—Crowe & Dunlevy, P.C.

(57) ABSTRACT

The present invention provides a method for the disinfection of seafood. The inventive method includes the steps of (a) preparing a concentrated aqueous solution of a chlorine dioxide liberating compound having a concentration of from about 0.2% to about 25% by weight of the chlorine dioxide liberating compound and having an amount of an acid sufficient to adjust the pH to from about 1.0 to about 5.0; (b) diluting the concentrated aqueous solution to provide a dilute, acidified solution having a concentration of from about 0.00017% to about 0.17% by weight of the chlorine dioxide liberating compound; and (c)contacting the dilute, acidified solution with seafood to disinfect the seafood. Preferably, the chlorine dioxide liberating compound is an alkali metal chlorites, with sodium chlorite and potassium chlorite being particularly preferred. The acid may be any acid generally regarded as safe, as that term is used in the Code of Federal Register, 21 CFR 170.35 and 21 CFR 170.30.

13 Claims, No Drawings

ACIDIFIED METAL CHLORITE SOLUTION FOR DISINFECTION OF SEAFOOD

RELATED APPLICATIONS

This application claims priority to Provisional Application No. 60/106,485 entitled "Acidified Chlorine Dioxide For Disinfection of Seafood" filed Oct. 30, 1998.

FIELD OF THE INVENTION

The present invention relates to an improved method for the treatment and disinfection of seafood, and more particularly, but not by way of limitation, to a method for disinfecting seafood by acidification of an aqueous solution of a chlorine dioxide liberating compound, such as a metal chlorite.

BACKGROUND OF THE INVENTION

Chlorine has been known to be an effective bactericide since the early 1940s. The concentration of chlorine that may be utilized as a disinfectant is limited, however, due to environmental and health concerns relating to the transfer of chlorine into the air. Therefore, low concentrations such as 20 ppm are typically employed for disinfection. Such a low concentrations, however, dilute the biocidal effects of the chlorine. Moreover, aqueous chlorine, which has been used for the sanitation of meats and seafood, creates safety concerns because of the formation of trihalomethanes and other potentially harmful reaction products.

As an alternative to chlorine, chlorine dioxide ($ClO_2$) has been explored as a potential substitute as a biocide. Chlorine dioxide is a strong oxidant and may be applied in a variety of processes including cellulose bleaching and treatment of waste water and drinking water. Moreover, chlorine dioxide has been effective as a potent bactericidal agent, significantly reducing the bacterial populations in poultry and meat. E.g., see U.S. Pat. No. 5,389,390 issued to Kross. Moreover, chlorine dioxide has long been used in the treatment of water supplies. Chlorine dioxide is also superior to gaseous chlorine in the removal of odors and tastes, and in destroying and removing algae or other organic material. Chlorine dioxide is further advantageous in that its biocidal activity is not affected by high pH or the presence of nitrogenous compounds. In essence, chlorine dioxide retains its biocidal capacity to a significantly greater extent and over a wider pH range than does gaseous chlorine. Since minimal reaction products, including trihalomethanes are produced in treated water, chlorine dioxide is an effective and safe substitute for aqueous chlorine.

However, certain problems have been encountered in the use of chlorine dioxide as a biocide. Chlorine dioxide as a concentrated gas is explosive and poisonous. Accordingly, chlorine dioxide is not often shipped in the gaseous state. It has thus become common practice to employ a chlorine dioxide releasing compound such as a sodium chlorite powder for safety reasons. Generation of chlorine dioxide from sodium chlorite or other chlorine dioxide releasing compounds is usually effected by addition of an acid, bleach (hypochlorite), or chlorine to the chlorine dioxide releasing compound.

Prior art techniques for disinfecting food substances such as those disclosed in U.S. Pat. No. 5,389,390 issued to Kross and U.S. Pat. No. 5,185,161 issued to Davidson et al. disclose acidifying and relatively dilute solutions of a metal chlorite for the purpose of disinfection. However, because these techniques acidify dilute solutions, they are often unable to effectively kill particularly troublesome bacteria such as Listeria Monocytogenes. Furthermore, the low pH of the solutions applied to the food product often has a deleterious effect on the product.

Fresh seafood products are particularly susceptible to spoilage by naturally occurring bacterial micro-flora. Additionally seafood products may carry disease-causing organisms such as Listeria Monocytogenes and Escherichia Coli and other enteric organisms which can cause serious health problems and in some cases death. Thus, there continues to be a need for a method for disinfecting seafood products.

SUMMARY OF THE INVENTION

The present invention provides a method for the disinfection of seafood. The inventive method includes the steps of (a) preparing a concentrated aqueous solution of a chlorine dioxide liberating compound having a concentration of from about 0.2% to about 25% by weight of the chlorine dioxide liberating compound and having an amount of an acid sufficient to adjust the pH to from about 1.0 to about 5.0; (b) diluting the concentrated aqueous solution to provide a dilute, acidified solution having a concentration of from about 0.00017% to about 0.17% by weight of the chlorine dioxide liberating compound; and (c) contacting the dilute, acidified solution with seafood to disinfect the seafood. Preferably, the chlorine dioxide liberating compound is an alkali metal chlorites, with sodium chlorite and potassium chlorite being particularly preferred. The acid may be any acid generally regarded as safe, as that term is used in the Code of Federal Register, 21 CFR 170.35 and 21 CFR 170.30.

DESCRIPTION OF THE INVENTION

The present invention provides a process for removal of bacteria and control of naturally occurring spoilage organisms on seafood, including without limitation, finfish, shellfish, and crustaceans. The present invention increases shelf-life and product freshness.

In accordance with the present invention, an aqueous solution is prepared containing from about 0.2% to about 25% by weight of a chlorine dioxide liberating compound, preferably a metal chlorite, and containing an acid in an amount sufficient to adjust the pH of the solution to from about 1.0 to about 5.0. The acid used may be any acid which is "generally regarded as safe" (i.e., a "GRAS" acid as that term is used in the Code of Federal Register, 21 CFR 170.35 and 21 CFR 170.30). After acidification, the aqueous metal chlorite solution is then diluted with water to a use concentration of about 0.00017% to about 0.17% by weight of the chlorine dioxide liberating compound, which corresponds to a concentration of about 0.0001% to about 0.1% by weight of total available chlorine dioxide. Total available chlorine dioxide is the sum of the dissolved chlorine dioxide gas and chlorite ion concentrations. The diluted, acidified chlorite solution will generate from about 0.01 to 50 ppm chlorine dioxide and will have a pH in the range of from about 5.0 to about 8.0.

Incubation time can vary from 1 minute to 1 hour, depending upon the concentration of the aqueous solution. The higher the concentration of the chlorine dioxide liberating compound, the less time required for incubation. For a solution having 3.35 by weight of sodium chlorite at a pH of 2.5, the preferred incubation time will be about 10 minutes.

The initial acidification of the relatively concentrated aqueous solution of the chlorine dioxide liberating compound provides a somewhat rapid generation of chlorine dioxide. The dilution step essentially quenches the reaction process and raises the pH of the solution, allowing further generation of chlorine dioxide to occur over a more extended period of time. When this solution is applied to seafood products, it provides certain advantages over prior art methods. First, the acidification of the relatively concentrated solution generates sufficient chlorine dioxide to serve as a "shock" treatment to kill particularly troublesome bacteria and other microbes that would be unresponsive to other approaches. Second, the pH of the solution is in the range of from about 5.0 to about 8.0 when it is applied to the seafood products. The more neutral pH solution that is applied is far less harmful to the seafood product than prior art approaches. Third, the quenching of the reaction process by dilution allows the solution to generate chlorine dioxide over a more extended period of time than approaches which merely acidify concentrated solutions of a metal chlorite and then directly apply the acidified chlorite solution to the item to be disinfected.

In a particularly preferred embodiment, an aqueous sodium chlorite solution having a concentration from about 0.5% to about 4% is prepared. A strong inorganic acid, such as phosphoric, hydrochloric or sulfuric, or an organic acid such as citric acid is added to the solution in sufficient amount to adjust the pH from about 2.5 to about 2.9. The solution is then diluted to a use concentration of from about 0.0005% to about 0.01% total available chlorine dioxide by weight, as defined above.

Preferred acids are strong inorganic acids such as phosphoric, hydrochloric or sulfuric acid, as well as organic acids such as citric. Preferred metal chlorites are alkali chlorites such as sodium or potassium chlorite. The metal chlorite is present for the liberation of chlorine dioxide. Because chlorine dioxide gas is highly unstable, it is generated in solution. While any chlorine dioxide liberating compound may be used, water-soluble chlorites are preferred because they are readily available and inexpensive.

The acidified sodium chlorite solution containing chlorine dioxide may be contacted with seafood products directly or by addition to process waters which contact the seafood products during normal processing operations both on board ships and at onshore seafood processing and point of sale facilities. In the event that the acidified chlorite solution of the present invention is added to processing water, the addition is to be taken as the final dilution step described above so that the concentration of the chlorite in the processing water is within the desired use concentration range stated above.

Acidified metal alkali chlorite solutions contain chlorine dioxide as the active ingredient and the biocidal component which, when in contact with the seafood product, provides the desired technical effect of inhibiting the growth of naturally occurring spoilage bacteria, thereby resulting in reduced spoilage of seafood, enhanced freshness and more aesthetically pleasing seafood, with resultant extension of the storage life for the treated seafood. Seafood products which may be treated in accordance with the present invention include, but are not limited to, fish, including freshwater fish, scallops, shrimp, crabs, clams, oysters and squid.

The acidified chlorite solution containing chlorine dioxide may be treated as a batch process or fed by suitable controlled metering devices into water such as brine water soak solutions, potable fresh processing waters and seawater process waters. The process waters, thus described, are intended for use in the cooling, cleaning, washing and soaking of seafood as may be performed in accordance with Good Manufacturing Practices for seafood processing operations. Appearance and quality are not compromised when acidified sodium chlorite solutions containing chlorine dioxide are utilized in the concentrations cited in this patent application.

EXAMPLES

Red Grouper and Salmon were treated in accordance with the present invention. A 3.35% by weight solution of sodium chlorate was acidified to a pH of 2.5. The solution was allowed to incubate for five minutes, and then diluted to the respective use concentrations.

Example 1

Sensory evaluation on the red grouper and salmon fillets was conducted by a panel consisting of ten trained individuals. The panelists used descriptive analysis to identify the characteristics that distinguish the treated samples from the nontreated control samples based on important sensory attributes such as feel, smell and appearance. The evaluation was conducted in accordance with the National Marine Fisheries Service (NMFS) Fishery Products Inspection Manual (Section I, Chapter 18, part II, Aug. 25, 1975). The degree of product degradation was categorized into slight (grade A), moderate (grade B) and excessive (grade C). Triplicate samples were used for each treatment condition.

After seven days, it was observed by the panelists that the untreated grouper and salmon fillets degraded from category A to category C, whereas, the fillets that were treated with a 30 ppm use concentration of acidified sodium chlorite maintained a minimum of B grade.

Example 2

The effectiveness of the present process was tested against the organism $Str^R$-$L.monocytogenes$ Scott A, grouper. Grouper cubes of about 2,1000 g were mixed for 2 minutes with a $Str^R$- $L.monocytogenes$ Scott A suspension ($1.83 \times 10^6$ CFU/mL) in a 2,100 mL Butterfield's phosphate buffer. The spiked fish cubes were placed in a plastic bag and stored overnight at 4° C. After 24 hours the spiked grouper cubes were treated with acidified sodium chlorite solutions concentrations of 30, 65, 170, and 330 ppm in brine water. The ratio of the fish mass to the treatment water was 1:5 (w/v) and the contact time was 5 minutes. At each time interval (0, 1 and 4 days), quadruplicate samples were randomly removed from each treatment and homogenized with 9 volumes (w/v) of Butterfield phosphate buffer. A 0.1 mL aliquot of each diluted sample was plated on quadruplicate TSA-YE-STR plates. Bacterial numbers in CFU/g fish were transferred to $\log_{10}$ statistical analysis.

The following results were observed:
  (a) On day 0, the treatment of spiked grouper cubes with acidified sodium chlorite caused a significant reduction in bacterial numbers as compared to the nontreated control. Spiked cubes treated with acidified sodium chlorite at 170 ppm had significantly less bacterial numbers than those treated with brine water or 30 ppm acidified sodium chlorite.
  (b) Storage of 30 ppm acidified sodium chlorite treated grouper cubes at 4° C. for 1 or 4 days caused a significant reduction in counts on the spiked samples over the nonstorage sample.
  (c) The treatment of spiked grouper cubes with brine water or acidified sodium chlorite at 30, 65, 170 or 330 ppm followed by one-day storage at 4° C. caused a significant reduction in bacterial numbers over the nontreated control.

It is clear that the present invention is well adapted to attain the ends and advantages mentioned as well as those inherent therein. While a presently preferred embodiment of the invention has been described for purposes of the disclosure, it will be understood that numerous changes may be made which will readily suggest themselves to those skilled in the art and which are encompassed within the spirit of the invention.

What is claimed is:

1. A method for the disinfection of seafood comprising the steps of:

preparing a concentrated aqueous solution of a chlorine dioxide liberating compound having a concentration of from about 0.2% to about 25% by weight of the chlorine dioxide liberating compound and having an amount of an acid sufficient to adjust the pH to from about 1.0 to about 5.0;

diluting the concentrated aqueous solution to provide a dilute, acidified solution having a concentration of from about 0.00017% to about 0.17% by weight of the chlorine dioxide liberating compound; and contacting the dilute, acidified solution with seafood to disinfect the seafood.

2. The method of claim 1 wherein the chlorine dioxide liberating compound is selected from the group consisting of metal chlorites.

3. The method of claim 2 wherein the chlorine dioxide liberating compound is selected from the group consisting of alkali metal chlorites.

4. The method of claim 2 wherein the chlorine dioxide liberating compound is selected from the group consisting of sodium chlorite and potassium chlorite.

5. The method of claim 2 wherein the chlorine dioxide liberating compound is sodium chlorite.

6. The method of claim 2 wherein the acid is citric acid.

7. The method of claim 2 wherein the acid is selected from the group consisting of all GRAS acids.

8. A method for the disinfection of seafood comprising the steps of:

preparing a concentrated aqueous solution of a metal chlorite having a concentration of from about 0.2% to about 25% by weight of the metal chlorite and having an amount of an acid sufficient to adjust the pH to from about 1.0 to about 5.0;

diluting the concentrated aqueous solution to provide a dilute, acidified solution having a concentration of from about 0.00017% to about 0.17% by weight of the metal chlorite; and contacting the dilute, acidified solution with seafood to disinfect the seafood.

9. The method of claim 8 wherein the concentrated aqueous solution of metal chlorite has a concentration of from about 0.5% to about 4.0% by weight of metal chlorite.

10. The method of claim 9 wherein sufficient acid is added to the concentrated aqueous solution to adjust the pH to from about 2.5 to about 2.9.

11. The method of claim 10 wherein the chlorine dioxide liberating compound is sodium chlorite.

12. The method of claim 11 wherein the acid is selected from the group consisting of strong acids and weak organic acids.

13. The method of claim 12 wherein the acid is selected from the group consisting of all GRAS acids.

* * * * *

Disclaimer 6,383,541 B1 — Bobby C. Danner, Norman, OK; Paul Reeves, Norman, OK; Neeraj Khanna, Norman, OK. ACIDIFIED METAL CHLORITE SOLUTION FOR DISINFECTION OF SEAFOOD. Patented May 7, 2002. Disclaimer filed August 19, 2003, by the assignee, Bio-Cide International, Inc.

Hereby enters this disclaimer to claims 1-13 of said patent.

*(Official Gazette, September 7, 2004)*